US012754995B2

(12) United States Patent
Kisley et al.

(10) Patent No.: US 12,754,995 B2
(45) Date of Patent: Oct. 6, 2026

(54) PASSWORDLESS VAULT FOR PASSWORD SECURITY

(71) Applicant: International Business Machines Corporation, Armonk, NY (US)

(72) Inventors: Richard Victor Kisley, Charlotte, NC (US); Juan F. Vargas, Cary, NC (US); Mark E. Maresh, Winter Garden, FL (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 18/817,687

(22) Filed: Aug. 28, 2024

(65) Prior Publication Data

US 2026/0064825 A1 Mar. 5, 2026

(51) Int. Cl.
*G06F 21/46* (2013.01)

(52) U.S. Cl.
CPC .................................... *G06F 21/46* (2013.01)

(58) Field of Classification Search
CPC ........................................................ G06F 21/46
USPC ............................................................... 726/1
See application file for complete search history.

(56) References Cited

U.S. PATENT DOCUMENTS 8,869,303 B2 10/2014 Fleysher
9,230,092 B1 * 1/2016 Juels ........................ G06F 21/46
9,396,318 B2 7/2016 Kowaka et al.
9,419,966 B2 8/2016 Natividad
9,712,521 B2 7/2017 Vargas et al.
10,395,015 B2 8/2019 Kline et al.
11,296,886 B2 4/2022 Kline et al.
2018/0013758 A1 * 1/2018 Yu ........................ H04L 63/0846
2023/0012801 A1 * 1/2023 Dorai ..................... G06F 16/156
2023/0198978 A1 * 6/2023 Wagener ................. G06F 21/31 726/4
2023/0244777 A1 * 8/2023 Miracolo ................ G06F 21/46 726/6
2023/0318820 A1 * 10/2023 Fooksman .............. G06F 21/46 713/184

(Continued)

FOREIGN PATENT DOCUMENTS

WO 2017/093917 A1 6/2017

OTHER PUBLICATIONS

Arculus, Secure Business Authentication Solutions, Retrieved from: <https://secure.getarculus.com/secure-authentication/?gclid=EAlalQobChMImNe18q2WgAMVJPXICh2kLgo0EAAYAyAAEgK-6vD_BWE>access on Jun. 7, 2024, 4 pages.

(Continued)

*Primary Examiner* — Dereena T Cattungal
(74) *Attorney, Agent, or Firm* — Stephen R. Yoder

(57) ABSTRACT

Passwords are repeatably generated for selected applications in a passwordless vault by applying an algorithm to certain stored application-specific information and a personal identification number, or PIN, provided by a requesting user. Upon authentication, the user requests a password for a selected application and enters an appropriate PIN. The password for the selected application is generated upon request rather than retrieved from storage. In that way, passwords themselves are not available upon mere access to the passwordless vault, which contains the stored application-specific information.

6 Claims, 5 Drawing Sheets

(56) References Cited

U.S. PATENT DOCUMENTS

| | | | | |
|---|---|---|---|---|
| 2023/0394135 | A1* | 12/2023 | Cox | G06F 21/46 |
| 2025/0086301 | A1* | 3/2025 | Walker | G06F 21/6218 |

OTHER PUBLICATIONS

Encrypted Data Vaults 0.1", Draft Community Group Report, Retrieved from: https://digitalbazaar.github.io/encrypted-data-vaults, Jul. 9, 2020, 51 pages.

Enterprise Password Manager Secure Password Vault for IT Teams, Password Vault, Retrieved from: https://www.securden.com/password-manager/index.html?gclid=EAIaIQobChMImNe18q2WgAMVJPXICh2kLgo0EAAYAiAAEgIC1_D_BWE, Jun. 7, 2024, 13 pages.

Key, Kim, Passkeys: What They are and Why You Need Them ASAP, PCMag, retrieved from: https://www.pcmag.com/explainers/passwordless-authentication-what-it-is-and-why-you-need-it-asap#:~:text=Several%20password%20managers%2C%20including%20Editors%27%20Choice%20winners%20Bitwarden,developing%20ways%20to%20store%20passkeys%20in%20customer%20vaults, Jun. 3, 2024, 11 pages.

Porter, Jon, "LastPass' Mobile App Offers Access to Your Desktop Vault With a Mater Password", The Verge, Retrieved from: https://www.theverge.com/2022/6/6/23156110/lastpass-authenticator-app-passwordless-login, Jun. 6, 2022, 5 pages.

Try Dashlane Business—Dashlane, Retrieved from: https://www.dashlane.com/business-password-manager/try?utm_source=adwords&utm_campaign=US_Search_B2B_Generic_Broad&utm_medium=cpc&utm_term=Password%2520Vault&gclid=CjwKCAjw44mlBhAQEiwAqP3eVq2qLZlo_BbmUHSsZwnMfT3LLzTTZHED5kaerQR_ebB4gNVWEWrZkxoC_ToQAvD_BWE, Jun. 7, 2024, 4 pages.

* cited by examiner

PASSWORDLESS VAULT FOR PASSWORD SECURITY

BACKGROUND

The present invention relates generally to the field of data security, and more particularly to password vaults.

A conventional password vault, also known as a password manager or password locker, is a program that securely stores credentials, such as usernames and passwords, for multiple applications within the registry of the vault. The credentials are often stored in an encrypted format. Authorized users typically access the password vault via a single principal password. Upon entry of the principal password, the user gains access to the credentials for accounts having information stored withing the registry.

SUMMARY

In one aspect of the present invention, a method, a computer program product, and a system for setting up a passwordless vault includes: receiving account parameters of a user account, including password rules; generating a unique key; storing the account parameters and the unique key in a passwordless vault; creating a generated password using the unique key, a character block of binary data, and a set of character tables, the generated password satisfying the password rules; and returning a display password to a requesting user based on the generated password.

In a further aspect of the present invention, a method, a computer program product, and a system for setting up a passwordless vault includes: receiving, in the account parameters, a user-defined password; performing a binary XOR operation on the user-defined password with the generated password to generate a password mask; and storing the password mask for the account in the passwordless vault.

In a still further aspect of the present invention, a method, a computer program product, and a system for setting up a passwordless vault includes: generating the character block of binary data based on the account parameters; parsing a sub-set of characters of the character block of binary data; determining at least one of the sub-set of characters does not identify a first character of the generated password; removing a leading character of the sub-set of characters to form a remaining set of characters; adding a subsequent character from the character block of binary data to the remaining set of characters to form a replacement sub-set of characters, the replacement sub-set of characters identifying the first character of the generated password.

In yet another aspect of the present invention, a method, a computer program product, and a system for setting up a passwordless vault includes: generating the character block of binary data based on the account parameters; parsing a sub-set of characters of the character block of binary data, the sub-set of characters identifying a first character of the generated password; and sequentially parsing additional sub-sets of characters until the generated password satisfies the password rules, the parsing identifying subsequent characters of the generated password In another aspect of the present invention, a method, a computer program product, and a system for receiving a display password from a passwordless vault includes: receiving a selection of an account and a pre-defined PIN from a requesting user; obtaining account parameters for the account from the passwordless vault; creating a generated password using a set of character tables corresponding to the account, the creating of the generated password based on the obtained account parameters and the pre-defined PIN; returning, to the requesting user, a display password based on the generated password.

In a further aspect of the present invention, a method, a computer program product, and a system for receiving a display password from a passwordless vault includes: identifying a password mask associated with the account, the password mask stored in the passwordless vault; performing a binary XOR operation on the password mask with the generated password to generate the display password.

In yet a further aspect of the present invention, a method, a computer program product, and a system for receiving a display password from a passwordless vault includes: generating a block of binary data based on the account parameters; parsing a sub-set of characters of the block of binary data, the sub-set of characters identifying a first character of the generated password; and sequentially parsing additional sub-sets of characters until the generated password satisfies the password rules, the parsing identifying subsequent characters of the generated password.

In still yet a further aspect of the present invention, a method, a computer program product, and a system for receiving a display password from a passwordless vault includes: generating a block of binary data based on the account parameters; parsing a sub-set of characters of the block of binary data; determining at least one of the sub-set of characters does not identify a first character of the generated password; removing a leading character of the sub-set of characters to form a remaining set of characters; and adding a subsequent character from the block of binary data to the remaining set of characters to form a replacement sub-set of characters, the replacement sub-set of characters identifying the first character of the generated password.

DETAILED DESCRIPTION

Figure 1:
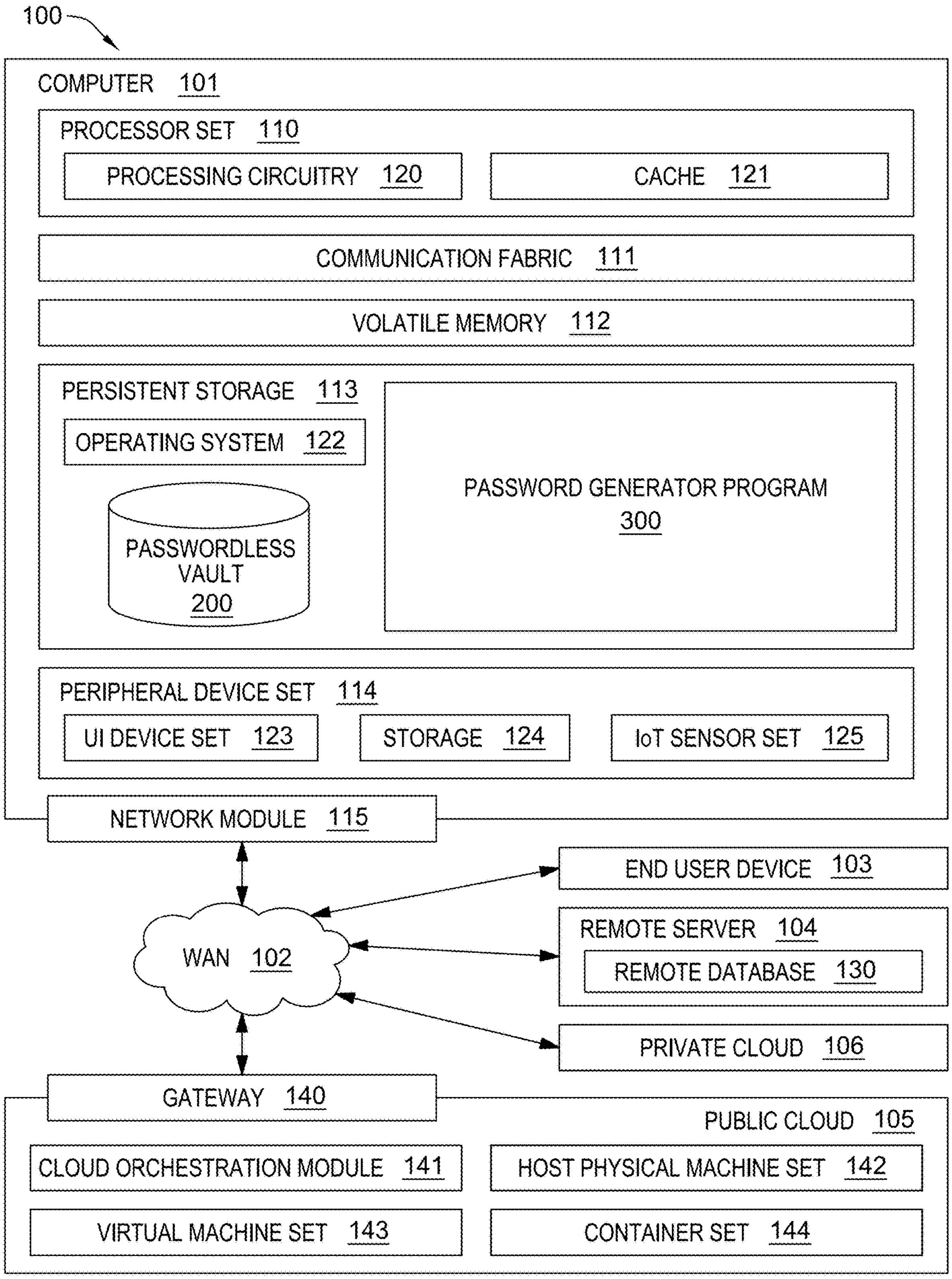
FIG. 1 is a schematic view of a first embodiment of a system according to the present invention.

Passwords are repeatably generated for selected applications in a passwordless vault by applying an algorithm to certain stored application-specific information and a personal identification number, or PIN, provided by a requesting user. Upon authentication, the user requests a password for a selected application and enters an appropriate PIN. The password for the selected application is generated upon request rather than retrieved from storage. In that way, passwords themselves are not available upon mere access to the passwordless vault, which contains the stored application-specific information. The present invention may be a system, a method, and/or a computer program product. The computer program product may include a computer readable storage medium (or media) having computer readable program instructions thereon for causing a processor to carry out aspects of the present invention.

The term "passwordless," as used herein, refers to storage of credentials where the passwords themselves are not stored, but are repeatably generated by a mechanism of the storage system. The storage system is referred to herein as a "passwordless vault."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not storage in the form of one or more transitory signals, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as password generator program 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122, passwordless vault 200, and block 300, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 represents the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Password generator program 300 operates to repeatably generate passwords for applications registered with a passwordless vault. The passwords are generated without retrieving the passwords themselves, but by applying an algorithm to certain application-specific information stored in the passwordless vault and a personal identification number, or PIN, provided by the requesting user. The passwordless vault is accessible by an authenticated user. Upon authentication, the user requests a password for a selected application and the password is generated upon request rather than retrieved from storage.

Some embodiments of the present invention recognize the following facts, potential problems and/or potential areas for improvement with respect to the current state of the art: (i) password vaults may be generally secure, but unauthorized access to the vault provides access to all the data in the vault including the stored passwords; and/or (ii) conventional password vaults store actual passwords.

Some embodiments of the present invention are directed toward a passwordless vault containing properties and parameters of registered applications instead of the passwords of the applications. The stored properties and parameters are used in a mechanism to generate consistent, repeatable passwords without storing the passwords themselves in the vault.

Some embodiments of the present invention are directed toward a method of using a passwordless vault to create reproducible passwords and to recreate user-selected passwords instead of storing them within the vault.

Some embodiments of the present invention are directed to setting up a passwordless vault with registered applications, or accounts, and corresponding application parameters, the setting up including: (i) establishing credentials, including a password, for the passwordless vault; (ii) registering applications requiring a password to gain access; (iii) inputting application parameters for each registered application, such as: version, rules, and pre-defined identification number (PIN), where the PIN may be numeric and/or alpha characters; (vi) generating, by the vault algorithm, a unique key per registered application and a random character table for each password character type (Upper, Lower, Special, Numeric) generated by the vault. The character tables may represent single characters of a particular type of character to enhance security of the generated password. Alternatively, the character tables may represent multiple characters of a particular type of character to accelerate satisfaction of a count of password characters.

Some embodiments of the present invention are directed to generating a unique password for each registered application by a processing including: (i) generating, by a character block algorithm, a block of binary data to be used as input characters for the generated password, with inputs for the character block algorithm being: the unique key, the account parameters, a counter, and a one-way function, such as a counter-mode block cipher or message authentication code (MAC); (ii) parsing the first three characters from the generated block of binary data, each three-character set determines a single character of the generated password, where: (a) the first character of the three-character set designates the type of the character used in the password (Upper, Lower, Special, Numeric) and (b) the second and third characters of the three-character set designates a current character, or character string, of the designated type from the corresponding password character table created by the vault algorithm (as noted above, the "current character" designated by the character table may be a single character or a string of characters); and (iii) performing a rules evaluation (e.g. minimum/maximum number of numerical characters, minimum/maximum number of alpha characters, special characters, and password length) of the generated password.

The process of generating a unique password may further include: (i) keeping the current character when the password rules are satisfied and the repeating the process of parsing by moving over one character to the right of the three-character set to obtain a new set of three-characters to evaluate, then proceeding as follows for each iteration until all the rules are satisfied including password length: (a) if the process has exhausted all the characters in the current block of binary data, the process will increment the counter and run the character block algorithm again to create a new block of binary data; and (b) if all rules are satisfied and enough password characters are generated, then the generated password is complete; and (ii) determining how to use the generated password for return to the user by: (a) if the user has selected to use the generated password, then the generated password is returned to the user; (b) if the user selected their own password, then the user-selected password is processed according to a binary XOR operation in view of the generated password to create a password mask, which is stored in the passwordless vault. It should be noted that the password mask allows the vault to recover the user-selected password from the generated password the next time the user needs it. The password mask is not useful as stored in the passwordless vault but must be operated on with a generated password according to embodiments of the present invention.

Some embodiments of the present invention are directed toward returning a password to a user when an authorized query is input to the passwordless vault, including the steps of: (i) launching the passwordless vault application and entering credentials for access to the vault; (ii) selecting a registered application; (iii) receiving a PIN corresponding to the selected application (if the vault is configured with a unique PIN per account); (iv) identifying the selected application in a lookup table in the vault and retrieving the application parameters, including a unique key and the password rules; (v) creating a generated password for display or for further processing depending on: (a) if the user provided a password for the registered application, the generated password is binary XORed with the stored password mask and the resulting password is set as the display password; and (b) if the system generated the password, the generated password is set as the display password; and (vi) displaying the display password to the user.

Figure 2:
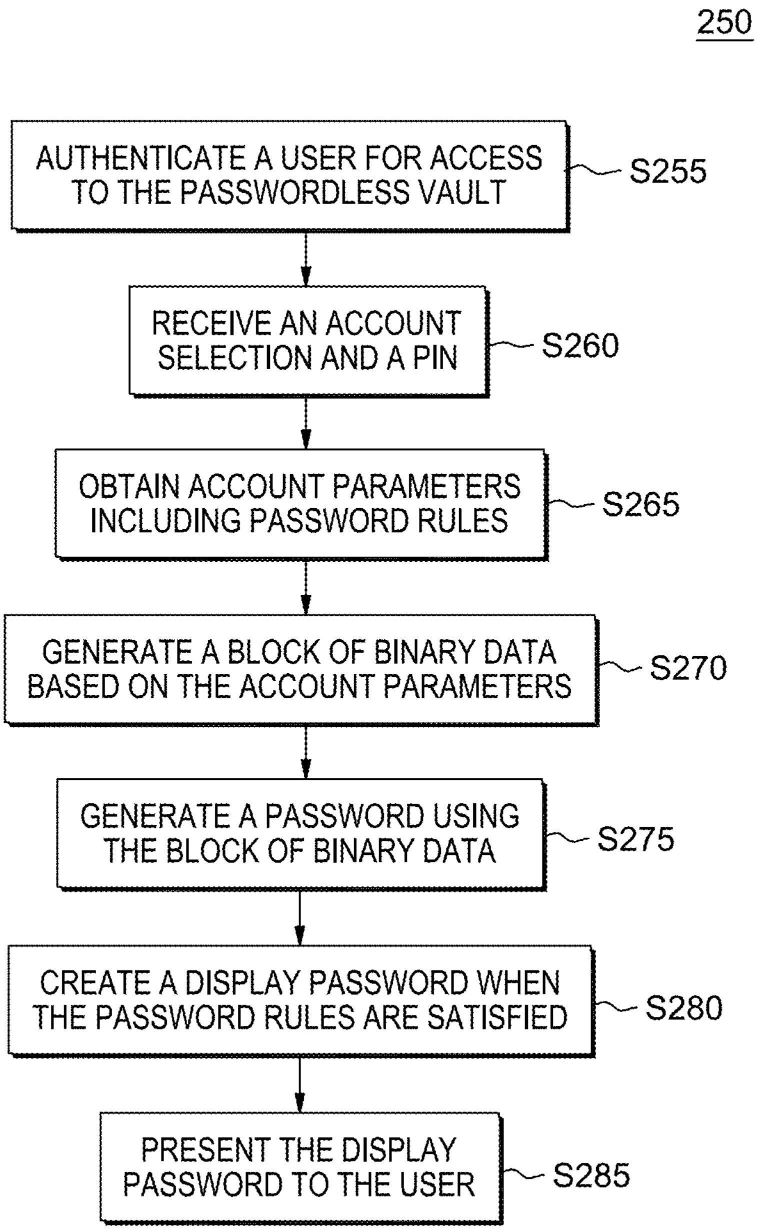
FIG. 2 is a flowchart showing a method performed, at least in part, by the first embodiment system.
Figure 3:
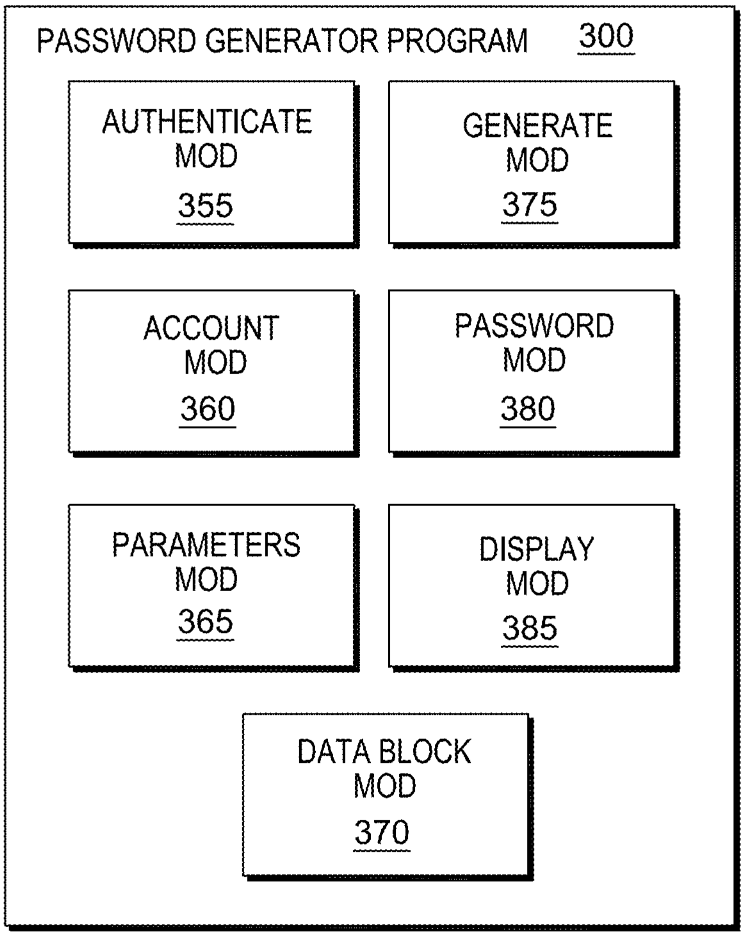
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where authenticate module ("mod") 355 authenticates a user for access to the passwordless vault. In this example, the user enters credentials into the vault application, including a username and a password. Alternatively, the user is authenticated by any one or more of authentication techniques known in the art. As noted herein, gaining access to the passwordless vault is merely a first step to discover passwords associated with a registered application. According to some embodiments of the present invention, there are no passwords, whether encrypted or not, stored in the passwordless vault. In that way, unauthorized access to the vault cannot yield passwords without further processing as described herein.

Processing proceeds to step S260, where account mod 360 receives an account selection and a corresponding pre-defined identification number (PIN). In this example, registered accounts are presented to the authenticated user for selection. When an account is selected, the user is prompted to enter the PIN corresponding to the selected account. In this example, the PIN is unique to the selected account. Alternatively, the PIN is a universal PIN for the entire vault. Alternatively, the PIN is associated with multiple accounts within the vault.

When the passwordless vault is set up for the selected account, the user provides certain account-specific information along with the PIN. The account-specific information and the designated PIN are used by the character block algorithm to generate a block of binary data for use in generating a unique password for the selected account. When setting up the account, the vault algorithm generates a random table for character types, including upper case, lower case, special characters, and numeric characters. An example random table is presented in Table 1. The generated table and the block of binary data are referenced when generating the password, referred to herein as the generated password.

Processing proceeds to step S265, where parameters mod 365 obtains the account parameters including password rules. The account parameters are the account-specific information provided by the user during account setup. Account parameters may include, for example, password rules, name of the account, the version of the selected account, and a pre-defined identification number, or PIN. The PIN may be account specific or assigned to the vault in which the account to registered. Password rules may include, for example, (i) length of the password; (ii) number of upper case, lower case, special characters, and numeric characters; and (iii) a password sequence rule, such as the sequence starts with the result of the operation of (9+interation), where the iteration increases by 1 count each time password character generation is performed. According to some embodiments of the present invention, a unique key is generated upon account set up and stored with the account parameters at the time of account setup. The unique key may be generated by a suitable random number generator that operates to produce the random bits of the unique key. According to some embodiments of the present invention, the application version may be used to create a different password using the same PIN, already assigned to the earlier version of the application.

Processing proceeds to step S270, where data block mod 370 generates a block of binary data based on the account parameters. In this example, the block of binary data is generated as a function of the PIN, the password length, the application version, and the counter. Alternatively, other pre-defined application parameters are the basis of the block of binary data.

Processing proceeds to step S275, where generate mod 375 generates a password using the block of binary data. The password is complete when all of the password rules are satisfied. Each character is determined using the block of binary data and the corresponding table of character types. In this example, the character type is defined by parsing the block of binary data into a set of three characters. The first character identifies the character type and the next two characters identify the character from the corresponding character table. An example character table is shown in Table 1. The example table is a single table having separate columns for each represented character type. Alternatively, each table represents a character type, so the first character of the set of three indicates which character table to use. According to some embodiments of the present invention, a subset of all possible character types are used for a given account password.

The generated password is evaluated for each added character to determine suitability of the generated password. Some passwords require an additional block of binary data be generated for additional processing before sufficient characters are created to satisfy the password rules.

Processing proceeds to step S280, where password mod 380 creates a display password when the password rules are satisfied. When the generated password satisfies the password rules, a decision is made whether to display the generated password as the display password or to use a password mask to generate a user-defined password. When a user-defined password is used, the generated password is binary XORed with the stored password mask, created at setup. In that case, the resulting password is the display password.

Processing ends at step S285, where display mod 385 presents the display password to the user. When the display password is determined, whether via the password mask or the generated password, the user is presented with the final password for use to access the selected application or account.

Further embodiments of the present invention are discussed in the paragraphs that follow and later with reference to FIGS. 4 and 5.

According to some embodiments of the present invention, the user accesses the passwordless vault using a typical set of credentials, including a username and password. However, when the user gains access to the vault, a list of accounts are displayed to the user for selection. Alternatively, a table of accounts is available for searching. Some embodiments of the present invention include both real and fictitious accounts, to further obfuscate real accounts. The user may select the desired account and enter a pre-defined identification number, or PIN. Based on established password rules and parameters for the account, a unique password is created and displayed to the user for the selected account. The vault is not able to verify a displayed password as being correct because the vault does not store the passwords themselves.

Some embodiments of the present invention provide for the same PIN to be used for each account registered in the vault. If a user creates the password, the created password is provided while inputting other application parameters. As an enhanced security alternative, some embodiments of the present invention create unique character tables for each registered account instead of each vault having unique tables for each type of character. That is, when generating a random character table for each password character type (Upper, Lower, Special, Numeric), multiple tables for the same character type may be generated to correspond to one or more registered applications.

An example character block algorithm is as follows:

$$F_{Unique\text{-}Key}\langle PIN \mid \text{Password Length} \mid \text{Version} \mid \text{Counter}\rangle,$$

where:

- Counter increments are based on F block size,
- F is, for example, advanced encryption standard (AES), $HMAC_{SHA\text{-}256}$, or $HMAC_{SHA\text{-}512}$, and "Unique-Key" is random bits of length needed for F.

The character block algorithm can generate arbitrary length character strings. The term HMAC refers to hash-based message authentication code, a cryptographic authentication technique that uses a hash function and a secret key. In this example, the HMAC has a counter value, which allows the HMAC to be used as a counter-mode cipher, such that the character block algorithm repeats over a new concatenation as the counter increments. The term SHA is an acronym for secure hash algorithm, used for hashing data and certificate files. The unique key generated during setup may be used to encrypt the data, including the application-specific information, or as the key for applying HMAC to the data to generate the unique bytes.

According to some embodiments of the present invention, when a selected account fictitious, the disclosed process provides a fictitious password, which may be a randomly generated password. Alternatively, fictitious accounts may be assigned fictitious account parameters for generating the fictitious password. Further, if the user selects a wrong account and/or provides a wrong pin, the process logic still provides a password, which may not be a correct password so that the requesting user does not receive an indication of the error. This process operates as an additional layer of security for potentially unauthorized access.

In some embodiments of the present invention, the display password is displayed along with information associated with the account, such as account or application name and application version.

According to some embodiments of the present invention, if the authorized user cannot provide the PIN corresponding to the application, the application must be re-registered with the passwordless vault.

Some embodiments of the present invention recreate passwords on the fly when given a PIN and a registered account.

An example of a random scramble table generated by a vault algorithm is shown in Table 1, below. The scramble table is used in conjunction with the character block algorithm to generate a password when account information and a PIN are presented for processing. In this example, the scramble table is generated for each vault. Alternatively, the scramble table is generated for each account or for a set of accounts registered in the passwordless vault.

TABLE 1

Random Scramble Table.

| Index | Upper Case | Lower Case | Special Character | Number |
|---|---|---|---|---|
| 00 | B | e | # | 3 |
| 01 | M | g | * | 3 |
| 02 | V | w | % | 8 |
| 03 | C | q | ! | 7 |
| 04 | P | k | { | 0 |
| 05 | D | n | < | 6 |
| 06 | W | u | @ | 1 |
| 07 | T | n | " | 6 |
| 08 | O | e | ] | 7 |
| 09 | A | a | ; | 2 |
| 10 | M | x | & | 4 |
| 11 | R | v | \ | 8 |
| 12 | E | p | ~ | 4 |
| 13 | V | l | — | 7 |

Figure 4:
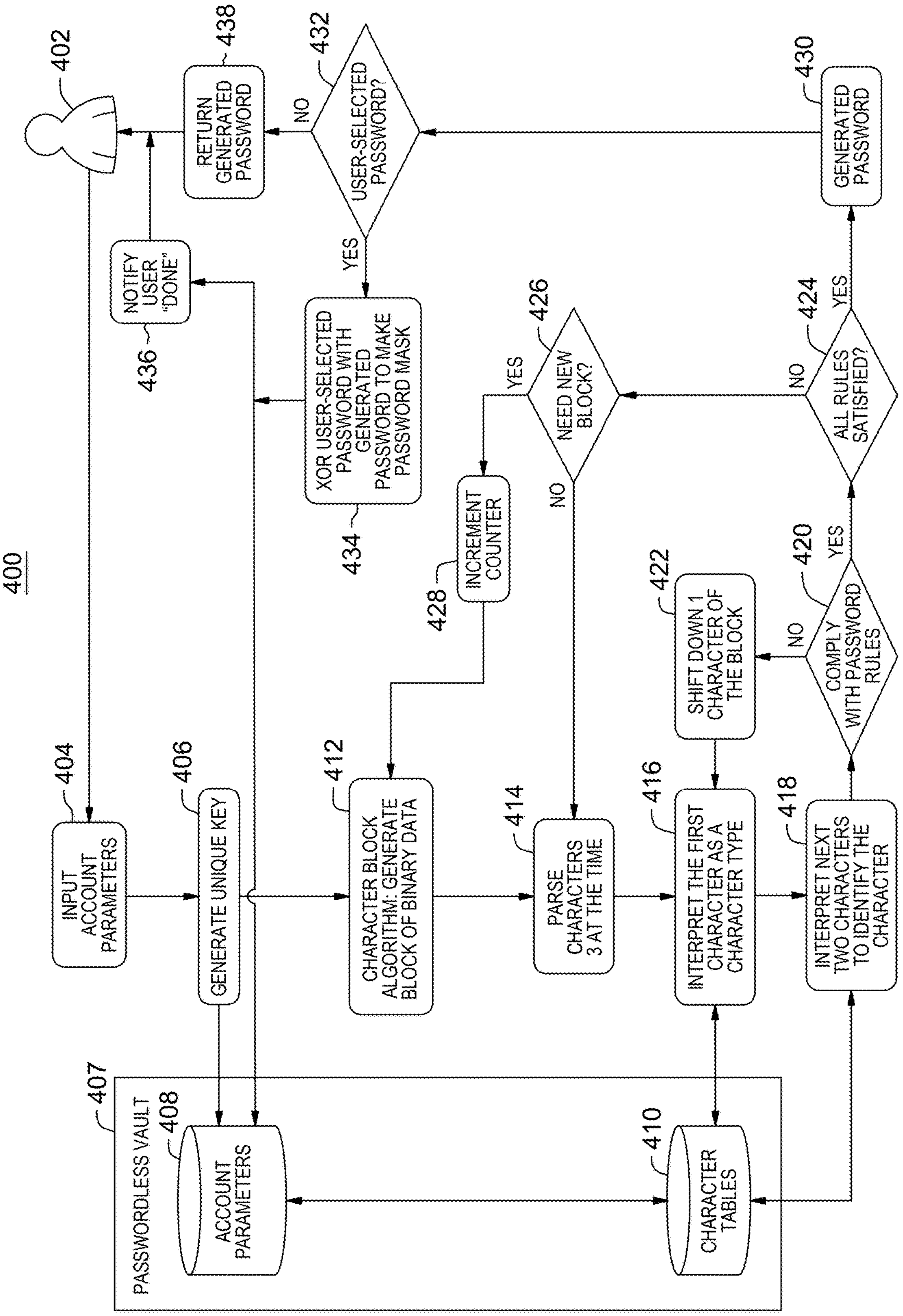
FIG. 4 is system flow diagram of a second embodiment of a method according to the present invention.

FIG. 4 shows flowchart 400 depicting a second method according to an embodiment of the present invention. This method for setting up a passwordless vault with a new account will now be discussed, over the course of the following paragraphs. Process 400 may be performed by a networked computer system, such as system 100 (FIG. 1).

Processing begins at step 404, where authorized user 402 provides account parameters, including password rules, predefined PIN, and, optionally, a user-defined password.

Processing proceeds to step 406, where the password system generates a unique key and stores the account parameters and unique key in account parameters store 408 or passwordless vault 407.

Processing proceeds to step 412, where the character block algorithm generates a block of binary data for use in creating the generated password. According to some embodiments of the present invention, the block of binary data is an HMAC-generated keyed hash based on the stored account parameters and a counter value.

Processing proceeds to step 414, where the password system parses the block of binary data to create a set of three characters, from the beginning of the binary data. As described later, sequential three-characters sets of the binary data block are used to generate additional characters of the generated password. Alternatively, sequential two-character sets or four-character sets are used.

Processing proceeds to step 416, where the password system interprets the first character of the three-character set to identify the character type according to character types identified in character tables store 410 of passwordless vault 407.

Processing proceeds to step 418, where the password system interprets the next two characters of the three-character set to identify the character to be used as the current character.

Processing proceeds to decision step 420, where it is decided whether or not the current character complies with the password rules. If so, processing proceeds to step 424. If not, processing proceeds to step 422, where additional characters are identified. For example, not every number works as a first character, in step 416, such a 4, 6, and 12, because there are no values in the lower two bits. Accordingly, when the process fails to identify a character type, or a current character, processing proceeds down the "No" branch, where a next character is added and the first character is dropped.

Following the "no" branch to step 422, the password system shifts down one character of the block of binary data and returns to steps 416 and 418, the new character string is processed to identify the character type and the next character to be used in the generated password. For example, if the first three characters were "459" in step 414, the character "4" would fail and be dropped in step 422 for a next character in a ratcheting-like action, where the block of binary data is "459"6, the new three-character set would be 4"596," shifting the selection to drop the leading character, "4."

Following the "yes" branch to decision step 424, the password system determines whether or not the generated password complies with all the password rules. If so, processing follows the "Yes" branch to step 430. If not, processing follows the "No" branch to decision step 426.

Following the "No" branch to step 426, the password system determines whether or not an additional block of binary data is needed. If not, processing follows the "No" branch, returning to step 414 to process a subsequent three-character set. If an additional data block is needed, processing follows the "Yes" branch to step 428.

Following the "Yes" branch, processing proceeds to step 428, where the counter is incremented by one.

Processing returns to step 412, where the character block algorithm generates another block of binary data based at least on the incremented counter as one of the parameters.

Now, following the "Yes" branch from step 424, processing proceeds to step 430, where the generated password is identified.

Processing proceeds to decision step 432, where the system decides whether or not a user-selected password is available for the selected account. According to some embodiments of the present invention, the system identifies a user-selected password in the account parameters provided by the user in step 404 to decide that a user-selected password is available. If a user-selected password is not available, processing follows the "No" branch to step 438. If a user-selected password is available, processing follows the "Yes" branch to step 434.

Following the "Yes" branch, processing proceeds to step 434, where the user-selected password is binary XORed with the generated password from step 430 to make a password mask. The password mask is stored in the account parameters store 408 and processing ends at step 436, where the user 402 receives notice that the password generation process is completed.

Now, following the "No" branch from step 432, processing ends at step 438, where the password system returns the generated password to the user 402.

Figure 5:
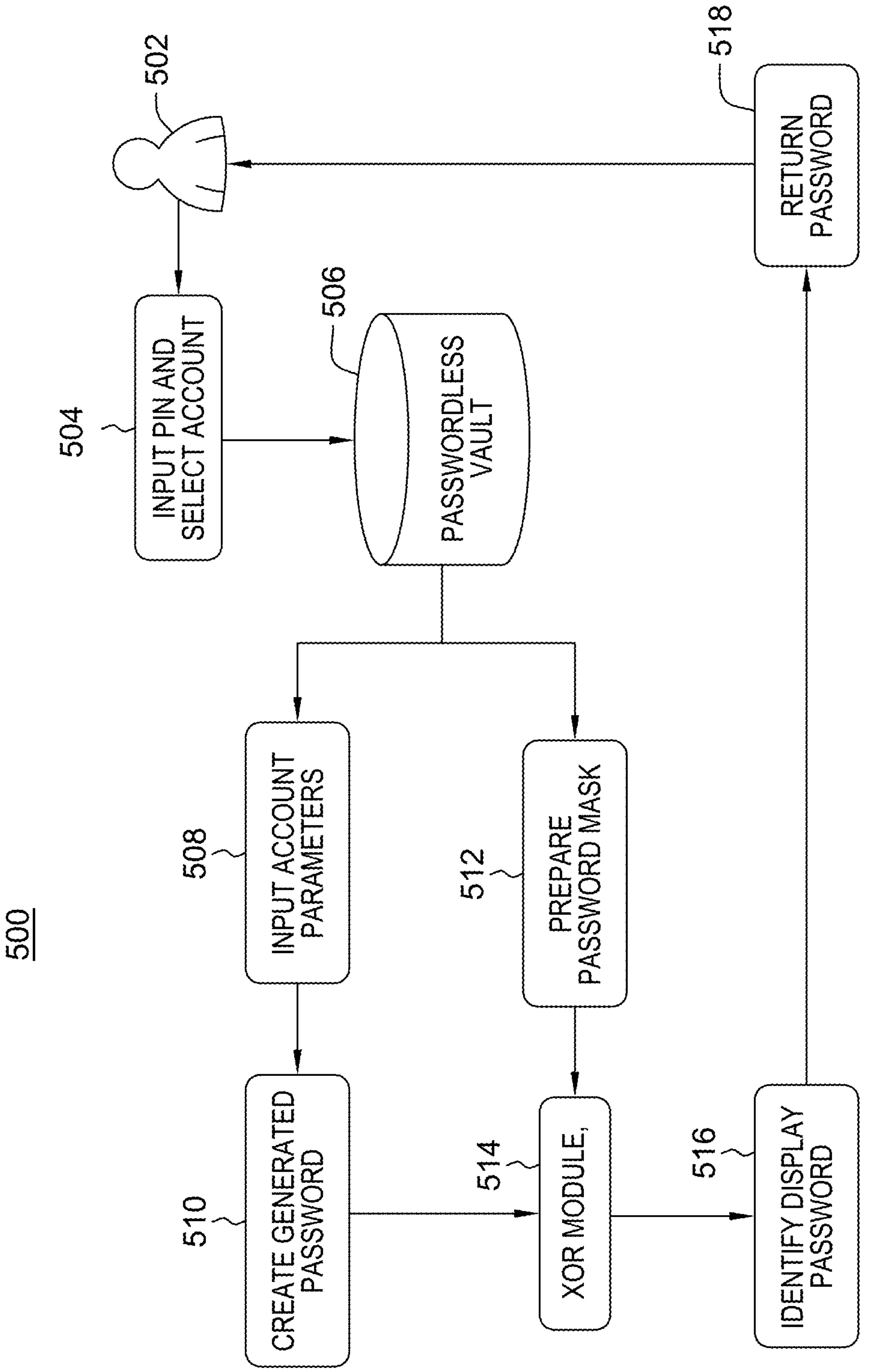
FIG. 5 is a system flow diagram of a third embodiment of a method according to the present invention.

FIG. 5 shows flowchart 500 depicting a third method according to an embodiment of the present invention. This method will now be discussed, over the course of the following paragraphs. Process 500 may be performed by a networked computer system, such as system 100 (FIG. 1).

Processing begins at step 504 where user 502 enters a pre-defined PIN during account selection. In this example, the PIN is a single vault-specific PIN. Alternatively, each account or a set of accounts within the passwordless vault are associate with a different PIN. Accordingly, the user enters the vault-specific PIN and selects a registered account for which a password will be generated. As discussed with respect to process 250 in FIG. 2, the password is generated and used to prepare a display password to be presented to the requesting user.

Processing proceeds to step 506, where the password system identifies the selected account and obtains from the vault the account parameters of the selected account.

Processing proceeds to step 508, where the password system inputs the account parameters for password generation.

Processing proceeds to step 510, where the password generator operates to create a generated password, which is a repeatable process based on the specific account parameters entered. Password generation in this step is similar to the process described in process 250 at steps S270 and S275 and also in process 400 at steps 412 to 428 using password parameters and the corresponding character tables from the passwordless vault 506. According to the process described herein, a generated password is created for input at step 514.

Processing proceeds to step 512, where the password system searches for a password mask in the passwordless vault 506. If a password mask is identified, it is retrieved for input at step 514. If there is no password mask identified in the passwordless vault, there is no user-defined password and a 0x00 bytes mask is prepared for input at step 514.

Processing proceeds to step 514, where the generated password is binary XORed with either the password mask or the 0x00 bytes mask, from step 512, to produce a display password corresponding to the selected account.

Processing proceeds to step 516, where the display password is established according to the binary XOR process of step 514. When the generated password is the display password, the binary XOR process does not modify the generated password, but it simply becomes the display password. When a stored password mask is used, the resulting display password is the user-defined password input during account setup.

Processing ends at step 518, where the password system returns the display password to the requesting user 502.

Some embodiments of the present invention may include one, or more, of the following features, characteristics and/or advantages: (i) storing properties and parameters of registered applications is more secure than storing the passwords themselves; (ii) no password or algorithm parameters are stored in the vault; (iii) unauthorized access to the passwordless vault does not yield access to individual account passwords; (iv) registered accounts can be setup with the same pre-defined identification number; (v) the passwordless vault may display both real and fictitious accounts for selection; (vi) different passwords are available responsive to the same pin because different registered accounts have varying input parameters, which drive the generated password creation.

Some embodiments of the present invention may include one, or more, of the following features, characteristics and/or advantages: (i) a unique PIN is assigned per application or per vault to generate repeatable, unique passwords; (ii) character-specific tables based on types of characters are used to generate passwords; (iii) the disclosed passwordless vault uses a character block algorithm that can reproduce passwords based on given input parameters and randomly generated character-specific tables, making it difficult for unauthorized users to predict a password or to determine the algorithm on which the generated password is based; (iv) passwords are not stored in the passwordless vault, whether the data is user-generated or system-generated; (v) identification numbers are not stored in the passwordless vault, whether the data is user-generated or system-generated; and/or (vi) the password algorithm can create different passwords using the same pin for different accounts while application-specific parameters will vary among registered accounts.

Some embodiments of the present invention are directed to a computer-implemented method for a passwordless password software vault stored on a computer system, the method including: (i) receiving, from a user device, a password assignment for a user to access a password vault stored on a computer system; (ii) receiving, from the user device, a group of accounts requiring passwords and receiving a PIN for each of the accounts in the group, respectively; (iii) generating a unique key for each of the accounts in the group and generating a random character table; (iv) generating, using a character block algorithm, a block of binary data for use as input characters; (v) parsing characters from the input characters to represent characters of passwords; (vi) performing a rules evaluation for each of the passwords; (vii) approving a password from the passwords when one or more of the passwords satisfies the rules evaluation; (viii) returning the approved password to the user device for use by the user; (ix) storing a password mask in the password vault when the user creates their own password; and thereby, in operation: (a) receiving, from the user using a user device, the password assigned to the password vault; (b) receiving a PIN for one of the accounts; and (c) sending the approved password for the account, or the user created password, to the user device for communication to the user.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for setting up a passwordless vault, the computer-implemented method comprising:

receiving account parameters of a user account, including password rules and a user-defined password;

generating, by a vault algorithm, a unique key for the user account;

storing the password rules and the unique key in a passwordless vault;

creating a generated password using the unique key, a character block of binary data, and a set of character tables, the generated password satisfying the password rules;

performing a binary XOR operation on the user-defined password with the generated password to generate a password mask; and storing the password mask for the account in the passwordless vault; and completing setup of the passwordless vault for the account.

2. The computer-implemented method of claim 1, wherein creating the generated password includes:

generating the character block of binary data based on the account parameters.

3. The computer-implemented method of claim 2, wherein creating the generated password further includes:

parsing a sub-set of characters of the character block of binary data, the sub-set of characters identifying a first character of the generated password; and sequentially parsing additional sub-sets of characters until the generated password satisfies the password rules, the parsing identifying subsequent characters of the generated password.

4. The computer-implemented method of claim 3, wherein the sub-set of characters is three characters including a first character, a second character, and a third character, the first character identifying a type of character in the set of character tables, and the second and third characters identifying a character of the generated password.

5. The computer-implemented method of claim 2, wherein creating the generated password further includes:

parsing a sub-set of characters of the character block of binary data;

determining at least one of the sub-set of characters does not identify a first character of the generated password;

removing a leading character of the sub-set of characters to form a remaining set of characters;

adding a subsequent character from the character block of binary data to the remaining set of characters to form a replacement sub-set of characters, the replacement sub-set of characters identifying the first character of the generated password.

6. The computer-implemented method of claim 1, further comprising:

establishing the set of character tables for the account based on the password rules.

* * * * *